United States Patent
Watanabe et al.

(10) Patent No.: US 9,662,989 B2
(45) Date of Patent: May 30, 2017

(54) FAULT DIAGNOSTIC DEVICE FOR VEHICLE CHARGING SYSTEM

(71) Applicant: MITSUBISHI JIDOSHA KOGYO KABUSHIKI KAISHA, Tokyo (JP)

(72) Inventors: Yu Watanabe, Okazaki (JP); Noriyoshi Aiba, Toyota (JP); Takashi Nonaka, Kasugai (JP); Kenji Kondo, Okazaki (JP); Yasuhiro Yamanaka, Okazaki (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 187 days.

(21) Appl. No.: 14/722,961

(22) Filed: May 27, 2015

(65) Prior Publication Data

US 2015/0343918 A1    Dec. 3, 2015

(30) Foreign Application Priority Data

May 27, 2014 (JP) .................................. 2014-109093
Apr. 21, 2015 (JP) .................................. 2015-086856

(51) Int. Cl.
*G01R 31/40* (2014.01)
*B60L 11/18* (2006.01)
(Continued)

(52) U.S. Cl.
CPC ......... *B60L 11/1816* (2013.01); *B60L 3/0046* (2013.01); *B60L 3/0084* (2013.01);
(Continued)

(58) Field of Classification Search
CPC ........ B60L 3/0046; B60L 3/0084; B60L 3/04; B60L 2210/30; B60L 2240/547; B60L 2250/12; B60L 11/1816; Y02T 10/7005; Y02T 10/7072; Y02T 10/7241; Y02T 90/127; Y02T 90/14; G01R 31/36
(Continued)

(56) References Cited

U.S. PATENT DOCUMENTS 6,194,877 B1 * 2/2001 Judge .................... H02J 7/1461
320/162
6,496,109 B1 * 12/2002 Guzick, Jr. ........... H02J 7/1461
340/450.3

(Continued)

FOREIGN PATENT DOCUMENTS

JP        4586888 B2    11/2010

*Primary Examiner* — Jermele M Hollington
*Assistant Examiner* — Sean Curtis
(74) *Attorney, Agent, or Firm* — Birch, Stewart, Kolasch & Birch, LLP

(57) ABSTRACT

A fault diagnostic device of a vehicle includes a starting circuit which causes a charger mounted on the vehicle to output a charging start signal and thereby activate a control unit for controlling charging of a battery mounted on the vehicle when a charging gun is connected to the charger. The control unit causes the charger to output the charging start signal when the charger is activated in response to turning on of an ignition switch, and has a fault determination function whereby, if the control unit is not input with the charging start signal, it is judged that a disconnection or power-supply short circuit has occurred in a charging start signal circuit of the starting circuit.

7 Claims, 6 Drawing Sheets

(51) Int. Cl.
*B60L 3/00* (2006.01)
*B60L 3/04* (2006.01)

(52) U.S. Cl.
CPC ............ *B60L 3/04* (2013.01); *B60L 2210/30* (2013.01); *B60L 2240/547* (2013.01); *B60L 2250/12* (2013.01); *Y02T 10/7005* (2013.01); *Y02T 10/7072* (2013.01); *Y02T 10/7241* (2013.01); *Y02T 90/127* (2013.01); *Y02T 90/14* (2013.01)

(58) Field of Classification Search
USPC ...... 324/764.01; 320/107–109; 701/22, 34.4; 307/9.1; 180/65.1, 65.7, 65.29
See application file for complete search history.

(56) References Cited

U.S. PATENT DOCUMENTS

| | | | | |
|---|---|---|---|---|
| 8,264,234 B2* | 9/2012 | Yano | ..................... | B60L 3/0046 324/509 |
| 8,294,415 B2* | 10/2012 | Fujitake | .................. | B60L 3/003 320/104 |
| 9,007,022 B2* | 4/2015 | Ohkuma | ................ | B60L 11/185 320/104 |
| 9,225,183 B2* | 12/2015 | King | ................... | B60R 16/0207 |
| 9,352,662 B2* | 5/2016 | Kaneyasu | ........... | B60L 11/1824 |
| 2009/0299561 A1* | 12/2009 | Matsumoto | ............. | B60K 6/28 701/22 |
| 2010/0244850 A1* | 9/2010 | Yano | ..................... | B60L 3/0046 324/510 |
| 2012/0109435 A1* | 5/2012 | Mikulec | ................... | B60K 6/48 701/22 |
| 2014/0062403 A1* | 3/2014 | Ohkuma | ................. | H02J 1/102 320/109 |
| 2014/0197790 A1* | 7/2014 | Kaneyasu | ........... | B60L 11/1824 320/109 |
| 2014/0288738 A1* | 9/2014 | Nordbruch | ........... | B60L 3/0069 701/22 |
| 2015/0343918 A1* | 12/2015 | Watanabe | ............. | B60L 3/0046 324/764.01 |
| 2015/0375633 A1* | 12/2015 | Masuda | .............. | B60L 11/1818 320/109 |
| 2016/0075250 A1* | 3/2016 | Lennevi | ................ | B60L 3/0023 701/22 |

* cited by examiner

FAULT DIAGNOSTIC DEVICE FOR VEHICLE CHARGING SYSTEM

BACKGROUND OF THE INVENTION

Field of the Invention

The present invention relates to techniques for diagnosing faults in a vehicle charging system for charging a battery mounted on the vehicle.

Description of the Related Art

In conventional electrically driven vehicles such as electric vehicles and plug-in hybrid vehicles in which a charger mounted on a vehicle is connected to an external power supply via a charging gun to charge a battery mounted on a vehicle, a starting circuit is mounted which detects connection of a charging gun to the vehicle and causes the charger to output a charging start signal to a control unit of the vehicle to activate the control unit so that the battery can be charged even while the power supply of the vehicle is turned off (ignition switch is off).

A variety of fault diagnostic devices have hitherto been proposed for such vehicles configured to be recharged by means of an external power supply. In Japanese Patent No. 4586888 by way of example, the frequency of diagnosis of various faults in vehicle-mounted devices is changed depending on whether an external power supply is connected or not, thereby securing an adequate frequency of diagnosis while at the same time restraining the consumption of electric power of the battery mounted on a vehicle.

In the aforementioned type of vehicles whose control unit can be activated when charging is to be started, a charging start signal circuit is provided which connects the charger and the control unit to allow a charging start signal to be output from the charger to the control unit.

However, if disconnection, power-supply short circuit or grounding fault occurs in the charging start signal circuit, the charging start signal may possibly fail to be input to the control unit accurately, making charging itself unachievable. Thus, there has been a demand for diagnosing faults in the charging start signal circuit.

SUMMARY OF THE INVENTION

An object of the present invention is therefore to provide a fault diagnostic device for a vehicle charging system which enables diagnosis of faults in a charging start signal circuit and thereby improves reliability of the vehicle charging system.

To achieve the object, the present invention provides a fault diagnostic device for a charging system of a vehicle, comprising: a control unit which is connected to a charger mounted on the vehicle for a battery mounted on the vehicle to constitute a circuit; and a charging start signal circuit which causes the charger to output a charging start signal to the control unit, wherein the control unit includes a fault determination unit which determines fault of the charging start signal circuit, and the fault determination unit judges the charging start signal circuit to be faulty if the control unit is not input with the charging start signal when the control unit is activated in response to turning on of an ignition switch of the vehicle.

Since the charging start signal circuit is provided, a charging start notification can be sent from the charger to the control unit. If the control unit is not input with the charging start signal when the control unit is activated in response to turning on of the ignition switch, it can be judged that a fault has occurred in the charging start signal circuit which causes the charger to output the charging start signal to the control unit. Since fault of the charging start signal circuit is determined each time the ignition switch is turned on, it is possible to increase the opportunity of fault determination and improve reliability of the charging system.

BRIEF DESCRIPTION OF THE DRAWINGS

The present invention will become more fully understood from the detailed description given hereinafter and the accompanying drawings which are given by way of illustration only, and thus, are not limitative of the present invention, and wherein:

FIG. 4 is a timing chart showing on-off timings of the charging start signal, the control unit, the EV power supply relay and the charger according to the first embodiment when the ignition switch is turned on.

DETAILED DESCRIPTION OF THE INVENTION

An embodiment of the present invention will be described below with reference to FIGS. 1 to 5.

Figure 1:
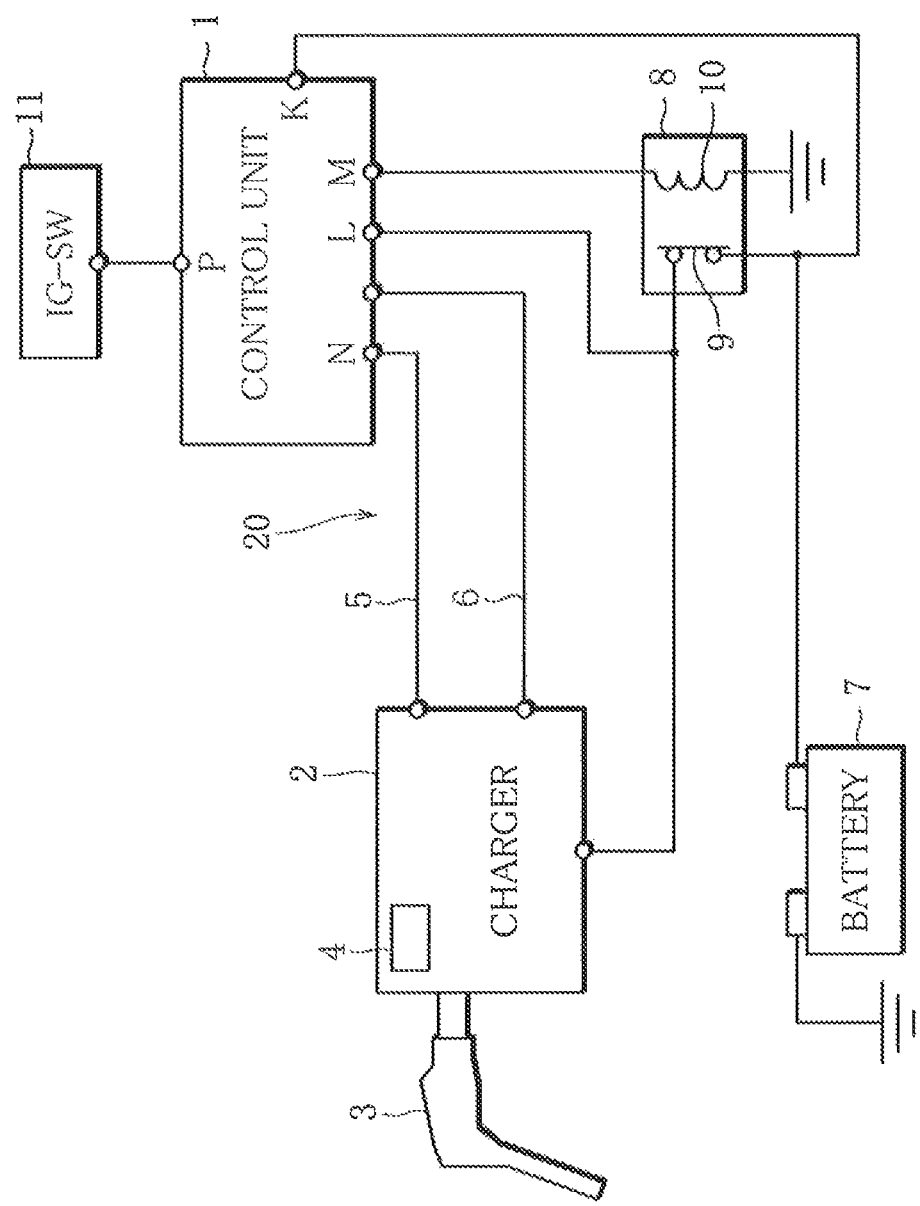
FIG. 1 illustrates a schematic configuration of a vehicle charging system according to an embodiment of the present invention.

FIG. 1 illustrates a schematic configuration of a vehicle charging system according to the embodiment of the present invention.

The present invention is applied to a charging system of a vehicle such as an electric vehicle or a plug-in hybrid vehicle, and the charging system is connected to an external power supply to charge a battery mounted on the vehicle for driving the vehicle.

The vehicle of the embodiment is equipped with a control unit 1 (control unit (including a fault determination unit and a fault determination prohibition unit)) for performing integrated control of the vehicle, and a charger 2 (charger mounted on the vehicle).

The control unit 1 has a charging control function whereby charging (charging current, charging voltage) of the driving battery is controlled.

The charger 2 can be connected with a charging gun 3 for supplying electric power from an external power supply.

The electric power supplied from the external power supply to the charger 2 via the charging gun 3 connected thereto is supplied to the driving battery, which is mounted on the vehicle though not shown, to charge the battery.

Further, the charger 2 has a built-in switch 4 for detecting the connection of the charging gun 3.

The control unit 1 and the charger 2 are connected to each other by a charging start signal circuit 5 for sending a charging start signal. When the charging gun 3 is connected to the charger 2, the charger 2 sends the charging start signal to the control unit 1 via the charging start signal circuit 5.

Also, the control unit 1 and the charger 2 are interconnected by a CAN (Controller Area Network) 6, and when the power supply of the vehicle is turned on (ignition switch is turned on), various control signals are exchanged between the control unit 1 and the charger 2 via the CAN 6.

A battery 7 is mounted on the vehicle as a power supply for supplying electric power to various vehicle-mounted devices such as the control unit 1. The battery 7 is connected to the control unit 1 and the charger 2 via a relay switch 9 of an EV power supply relay 8 mounted on the vehicle.

The EV power supply relay 8 has a coil 10 connected to an M terminal of the control unit 1, and the coil 10 closes the relay switch 9 when energized by electric current output from the control unit 1.

The control unit 1 is connected at its P terminal with an ignition switch (IG-SW) 11, and when the ignition switch 11 is on, that is, when the vehicle power supply is on, current flows through the P and M terminals and energizes the coil 10 of the EV power supply relay 8, so that the relay switch 9 is closed. Since the relay switch 9 is closed, the battery 7, the control unit 1 and the charger 2 are connected to one another, so that electric power is supplied from the battery 7 to an L terminal, which is a power supply terminal, of the control unit 1 and the charger 2.

Figure 2:
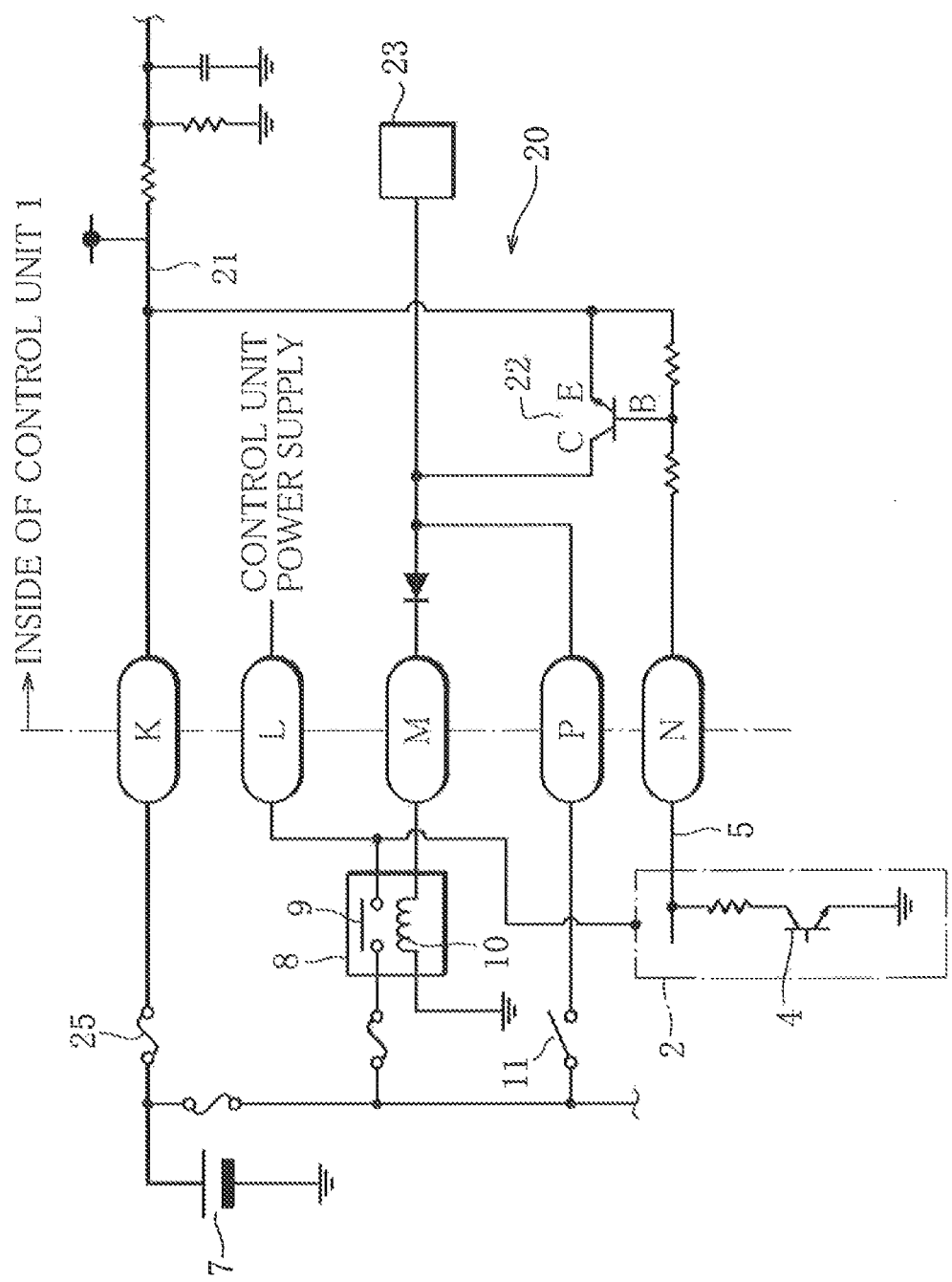
FIG. 2 is a circuit diagram illustrating the configuration of a starting circuit according to a first embodiment of the present invention.

FIG. 2 is a circuit diagram illustrating the configuration of a starting circuit 20 according to a first embodiment of the present invention.

As illustrated in FIG. 2, the control unit 1 is provided with a backup power supply circuit 21 (backup power supply) in order to retain data and the like stored in memory (RAM) thereof even in a state in which no electric power is supplied to the control unit 1, as in the case where the ignition switch is off, for example.

The backup power supply circuit 21 is always supplied with electric power from the battery 7.

The vehicle is equipped with the starting circuit 20. The starting circuit 20 comprises the aforementioned switch 4 in the charger 2, the charging start signal circuit 5, the EV power supply relay 8, the backup power supply circuit 21, and a transistor 22 in the control unit 1.

The transistor 22 is connected such that an emitter E thereof can be supplied with electric power from the backup power supply circuit 21. The transistor 22 has a base B connected to an N terminal which is connected to the charging start signal circuit 5, and has a collector C connected to an M terminal which is connected to the coil 10 of the EV power supply relay 8.

The collector C of the transistor 22 is also connected to a monitor circuit 23 which is provided in the control unit 1 to monitor input of the charging start signal to the control unit 1.

When the charging gun 3 is connected to the charger 2 and thus the switch 4 is turned on, electric current flows from the backup power supply circuit 21 to the switch 4 of the charger 2 through the emitter E and the base B of the transistor 22 and the charging start signal circuit 5. Also, current flows to the coil 10 of the EV power supply relay 8 connected to the collector C of the transistor 22, so that the EV power supply relay 8 is energized. As a result, the relay switch 9 of the EV power supply relay 8 is closed, and electric power is supplied from the battery 7 to the control unit 1 and the charger 2 to activate the same. Also, the current flowing in the charging start signal circuit 5 provides the charging start signal to the control unit 1, whereby the start of charging can be detected.

With the starting circuit 20 configured as described above, even while the ignition switch 11 is off and the control unit 1 and the charger 2 are not started, the control unit 1 and the charger 2 can be activated as soon as the charging gun 3 is connected, and the driving battery can be charged with electric power supplied from the external power supply via the charging gun 3.

Figure 3:
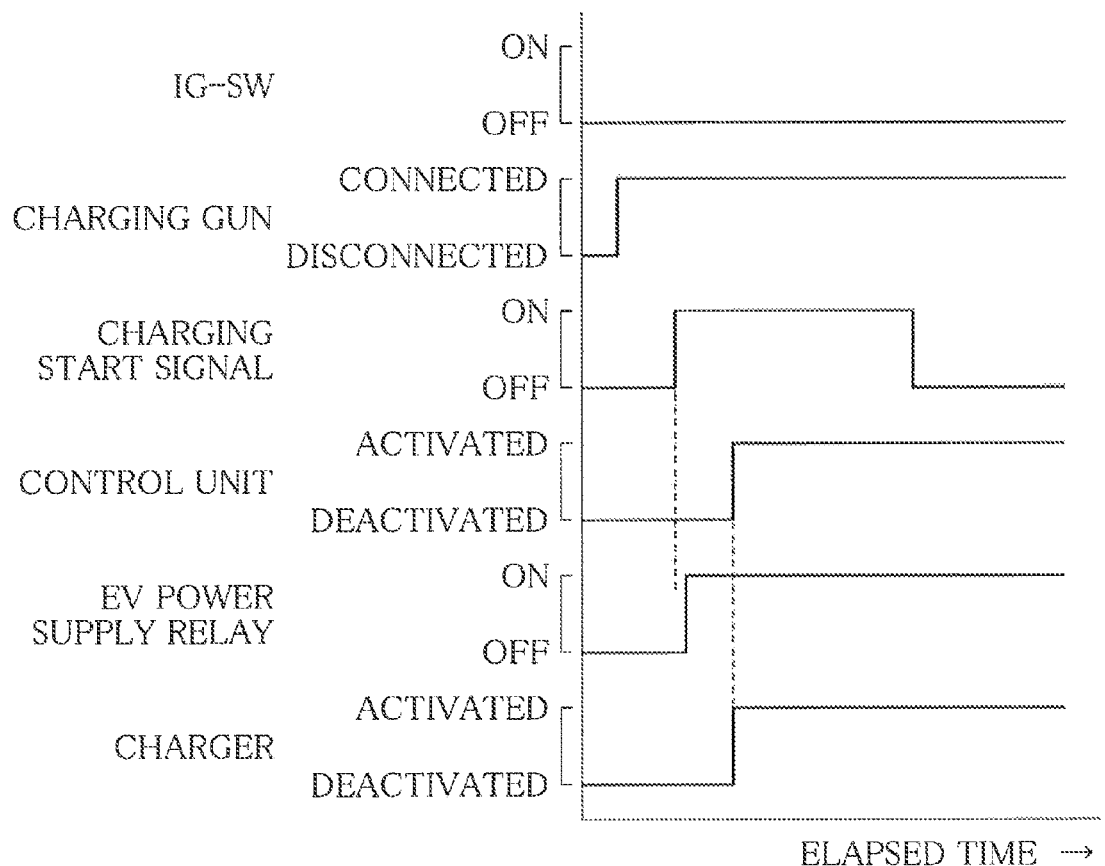
FIG. 3 is a timing chart showing on-off timings of a charging start signal, a control unit, an EV power supply relay and a charger mounted on the vehicle according to the first embodiment when a charging gun is connected with an ignition switch turned off.

FIG. 3 is a timing chart illustrating how the charging start signal, the control unit 1, the EV power supply relay 8 and the charger 2 are turned on (activated) and off (deactivated) according to the first embodiment when the charging gun 3 is connected while the ignition switch 11 is off.

As illustrated in FIG. 3, as soon as the charging gun 3 is connected while the ignition switch 11 is off, the charging start signal turns on, and the EV power supply relay 8 is turned on. Then, the control unit 1 and the charger 2 are successively activated.

The control unit 1 of this embodiment has a fault detection function (fault determination unit) for detecting a faulty state in which charging fails to be performed due to disconnection or power-supply short circuit of the charging start signal circuit 5 even though the charging gun 3 is connected.

Figure 4:
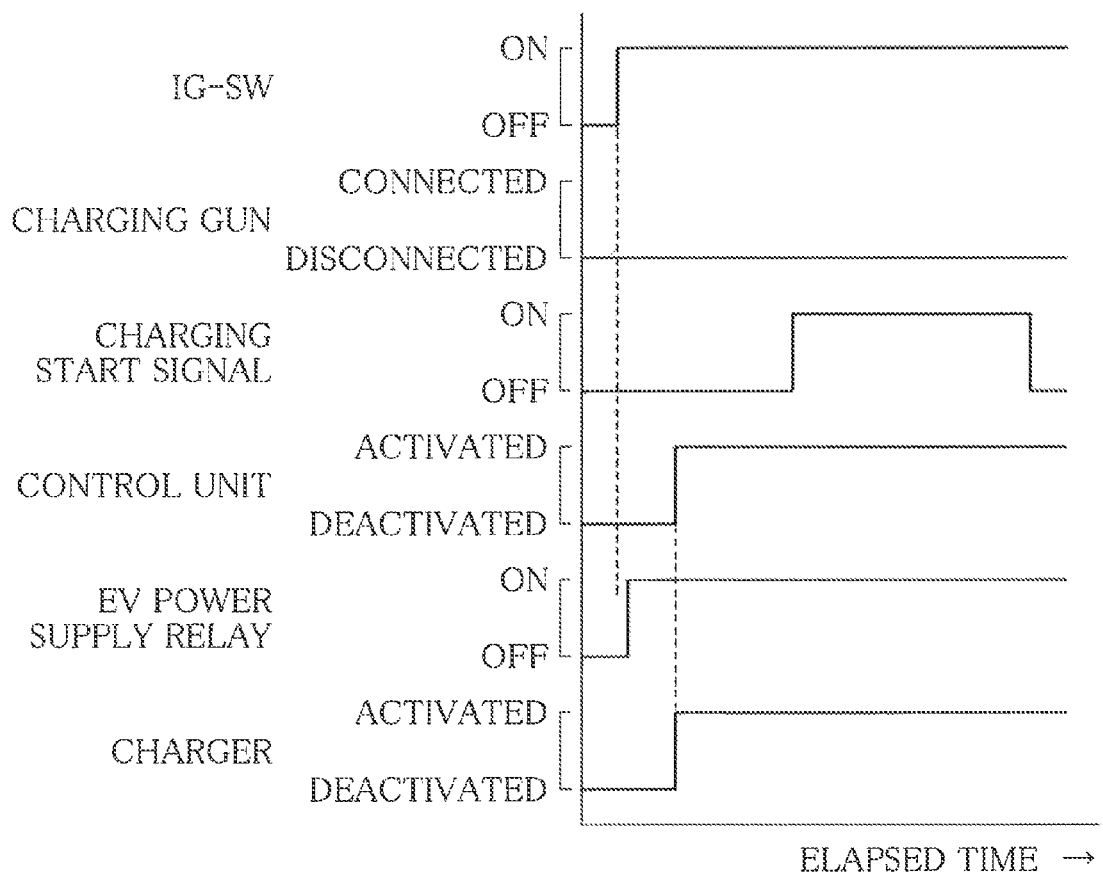

FIG. 4 is a timing chart illustrating how the charging start signal, the control unit 1, the EV power supply relay 8 and the charger 2 are turned on and off (activated and deactivated) according to the first embodiment when the ignition switch 11 is turned on. FIG. 5 is a timing chart illustrating an exemplary decision made by the fault detection function of the first embodiment, wherein (A) shows a normal state and (b) shows an anomalous state.

The fault detection function is performed when the ignition switch 11 is turned on.

When the ignition switch 11 is turned on as illustrated in FIG. 4, the EV power supply relay 8 is turned on, and the control unit 1 and the charger 2 are activated. The charger 2 has the function of turning on (outputting) the charging start signal temporarily (e.g., several seconds) after activation.

Figure 5A:
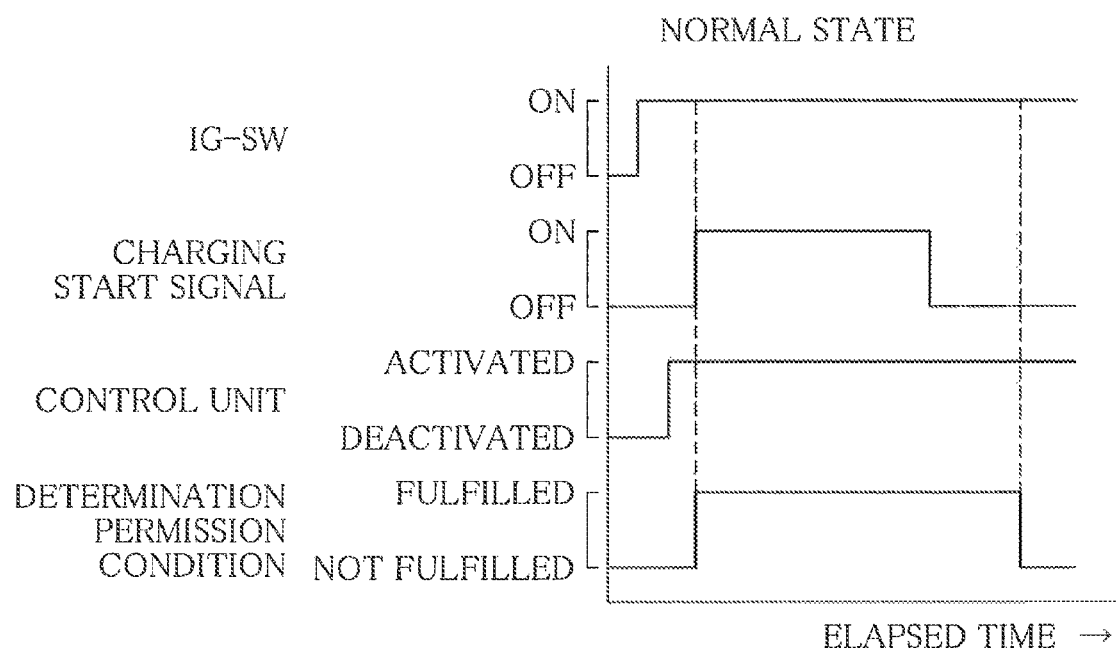
FIG. 5A and FIG. 5B are a timing chart illustrating an exemplary decision made by a fault detection function of the first embodiment.

Thus, in a normal state in which the charging start signal circuit 5 is free from disconnection and power-supply short circuit, the charging start signal temporarily turns on after the ignition switch 11 is turned on, as shown in FIG. 5(A), and is input to the control unit 1.

On the other hand, in the case of a disconnection or power-supply short circuit of the charging start signal circuit 5, no current flows to the N terminal (shown in FIGS. 1 and 2) connecting the charging start signal circuit 5 and the control unit 1. Consequently, the charging start signal, even if temporarily turned on after the ignition switch 11 is turned on, fails to reach the control unit 1.

Figure 5B:
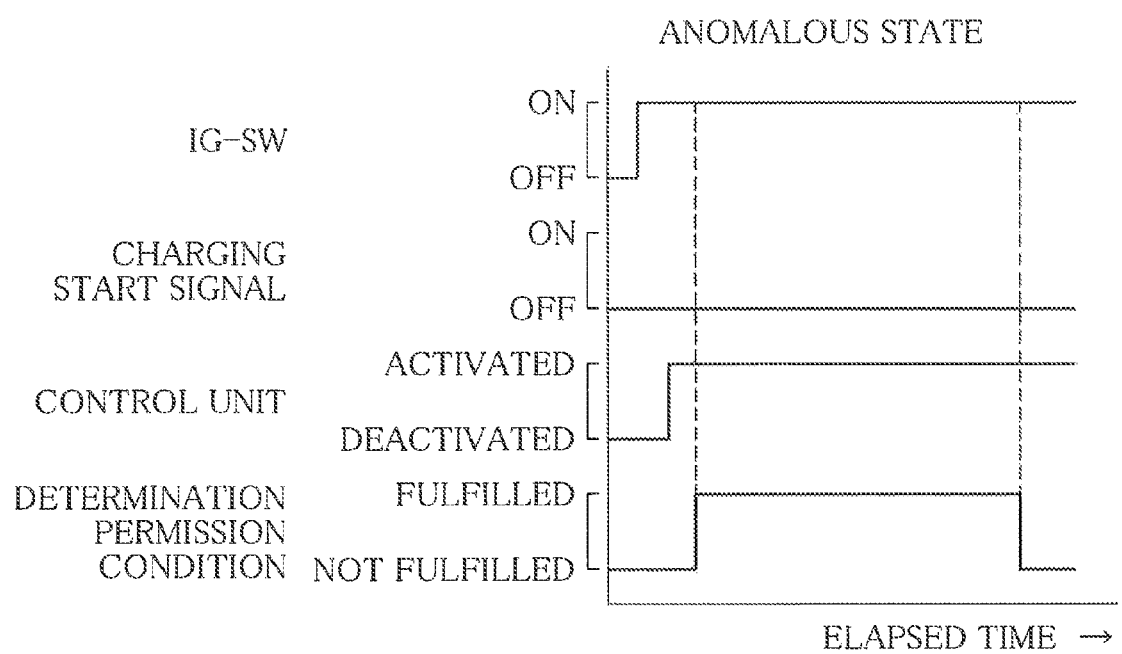

If the charging start signal fails to turn on (fails to be input to the control unit 1) while a determination permission condition is fulfilled (during a predetermined time (e.g., about three seconds or shorter) after the turning on of the ignition switch 11) as shown in FIG. 5(B), the control unit 1 judges that a disconnection or power-supply short circuit has occurred in the charging start signal circuit 5. The power-supply short circuit referred to herein denotes a state in which the charging start signal circuit 5 is short-circuited to the vehicle-side backup power supply circuit 21, for example.

Further, in this embodiment, the control unit 1 monitors the voltage of the backup power supply circuit 21 (power-supply voltage of the starting circuit 20), and if the voltage of the backup power supply circuit 21 is lower than a predetermined value, the control unit 1 prohibits determination from being made as to power-supply short circuit and disconnection of the charging start signal circuit 5 (fault determination prohibition unit). The predetermined value may be set at a value close to a lower-limit voltage at and above which the EV power supply relay 8 of the starting circuit 20 can be reliably energized when the switch 4 for detecting the connection of the charging gun 3 is turned on.

As described above, according to the embodiment, the charging start signal is temporarily output from the charger 2 when the ignition switch 11 is turned on, and if the charging start signal fails to be input to the control unit 1, it can be concluded that a fault has occurred in the charging start signal circuit 5. Since fault of the charging start signal circuit 5 is determined each time the ignition switch 11 is turned on, it is possible to increase the opportunity of fault determination and improve reliability of the charging system.

Further, the charging start signal circuit 5 is a circuit that connects the charger 2 and the control unit 1 to allow the charging start signal to be output from the charger 2 to the control unit 1, and therefore, when a fault of the charging start signal circuit 5 is detected in the manner explained above, it is possible to identify the detected fault as a disconnection or power-supply short circuit of the charging start signal circuit 5.

In the case of a circuit like the starting circuit 20 of the embodiment, if the voltage of the backup power supply circuit 21 is lower than or equal to the predetermined value, the charging start signal may possibly fail to be output to the control unit 1 even though the charging start signal circuit 5, the starting circuit 20 and other related components are normal, resulting in an erroneous decision that the charging start signal circuit 5 is faulty. For instance, the backup power supply circuit 21 is provided with a detachable fuse 25 in order to restrain discharge of the battery 7 during shipment and transportation of the vehicle. If the fuse 25 is not properly connected, the voltage of the backup power supply circuit 21 is fixed at zero, with the result that the charging start signal circuit 5 is judged to be faulty.

According to the embodiment, when the output voltage of the backup power supply circuit 21 is low, the function of detecting fault of the charging start signal circuit 5 is disabled, thereby avoiding an erroneous decision that the starting circuit 20 is faulty. Reliability of the fault detection function can therefore be improved.

When the present invention is applied to a charging system connected to an external power supply as in the present embodiment, the user can know the result of fault determination before connecting the charging gun 3 after turning on the ignition switch 11.

Figure 6:
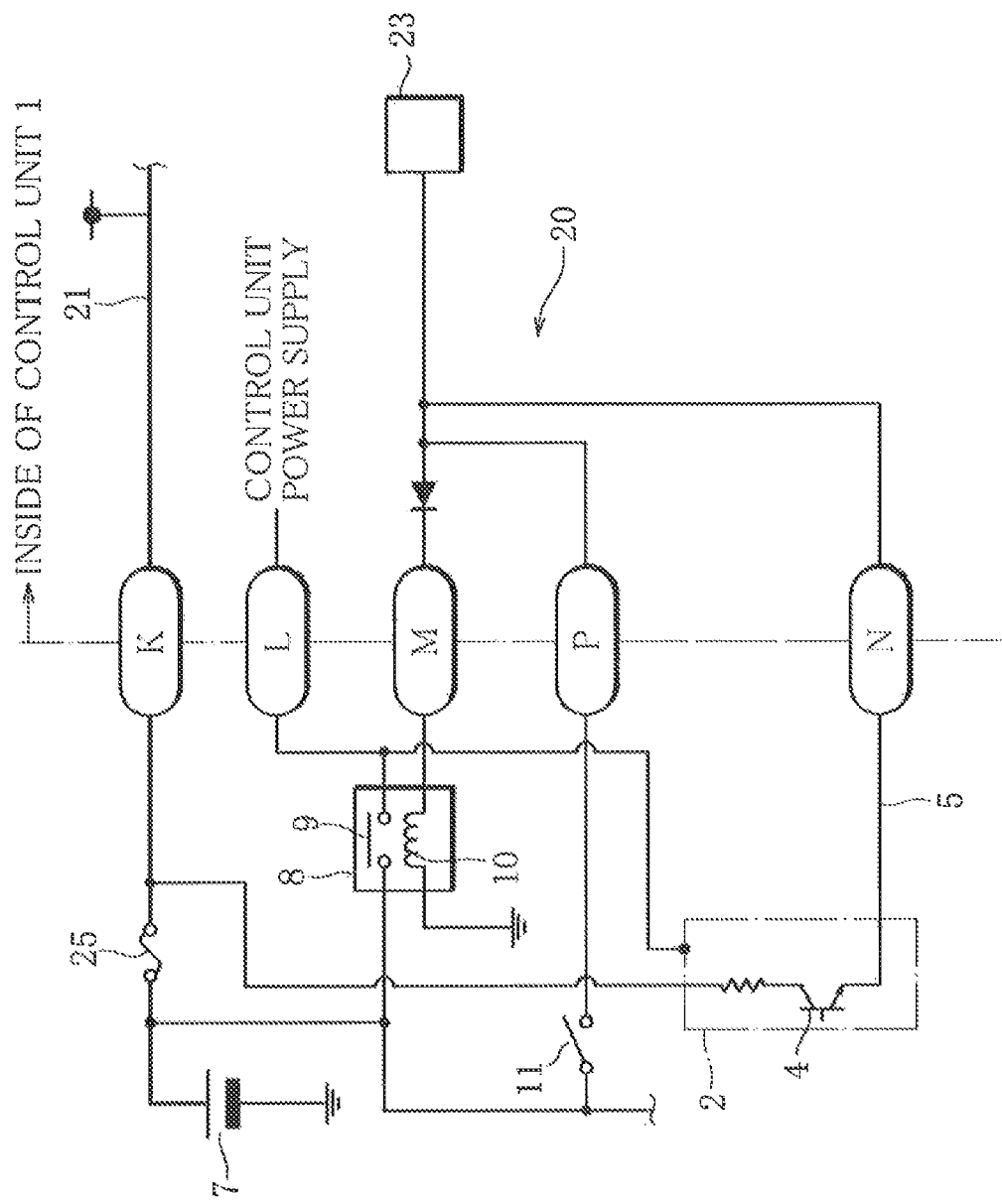
FIG. 6 is a circuit diagram illustrating the configuration of a starting circuit according to a second embodiment.

Referring now to FIG. 6, a second embodiment of the present invention will be described.

FIG. 6 is a circuit diagram illustrating the configuration of a starting circuit 20 according to the second embodiment. In FIG. 6, like reference signs refer to elements having like functions, shown in the circuit diagram of FIG. 2 illustrating the first embodiment, and for such elements, reference should be made to the explanation of FIG. 2.

In the circuit diagram of FIG. 2 illustrating the first embodiment, the backup power supply circuit 21 is connected via the transistor 22 to the N terminal connected to the charging start signal circuit 5 and is also connected via the transistor 22 to the M terminal connected to the coil 10 of the EV power supply relay 8, as stated above. In the circuit diagram of FIG. 6, on the other hand, the transistor 22 is omitted. The circuit diagram of FIG. 6 differs from that of FIG. 2 in that the backup power supply circuit 21 is connected to the charging start signal circuit 5 via the switch 4. Specifically, the backup power supply circuit 21 is connected at a point between the fuse 25 and the K terminal, where the vehicle-side section of the backup power supply circuit 21 is connected to the control unit 1, to the charging start signal circuit 5 via the switch 4, as shown in FIG. 6.

Also in the second embodiment, when the ignition switch 11 is turned on, the control unit 1 is activated as shown in FIG. 4. The control unit 1 supplies electric power to the coil 10 of the EV power supply relay 8 to energize the coil 10, and activates the charger 2 regardless of whether or not an external power supply is connected. The charger 2 turns on the charging start signal temporarily (e.g., several seconds) when operation thereof is started.

Thus, in a normal state in which the charging start signal circuit 5 shown in FIG. 6 is free from disconnection and grounding fault, the charging start signal temporarily turns on after the ignition switch 11 is turned on, as shown in FIG. 5(A), and is input to the control unit 1.

On the other hand, in the case of a disconnection or grounding fault of the charging start signal circuit 5 shown in FIG. 6, no current flows to the N terminal (shown in FIGS. 1 and 6) connecting the charging start signal circuit 5 and the control unit 1. Consequently, the charging start signal, even if temporarily turned on after the ignition switch 11 is turned on, fails to reach the control unit 1.

If the charging start signal fails to turn on (fails to be input to the control unit 1) while the determination permission condition is fulfilled (during the predetermined time (e.g., about three seconds or shorter) after the turning on of the ignition switch 11) as shown in FIG. 5(B), the control unit 1 judges that a disconnection or grounding fault has occurred in the charging start signal circuit 5. The grounding fault referred to herein denotes a state in which the charging start signal circuit 5 is connected, for example, to the vehicle body or the like.

Further, also in the second embodiment, the control unit 1 monitors the voltage of the backup power supply circuit 21 (power-supply voltage of the starting circuit 20), and if the voltage of the backup power supply circuit 21 is lower than the predetermined value, the control unit 1 prohibits determination from being made as to grounding fault and disconnection of the charging start signal circuit 5.

As described above, according to the second embodiment, when a fault of the charging start signal circuit 5 is detected, the detected fault can be identified as a disconnection or grounding fault of the charging start signal circuit 5, providing an advantageous effect similar to that achieved by the first embodiment.

While the embodiments of the present invention have been described above, it is to be noted that the present invention is not limited to the foregoing embodiments.

For example, in the above embodiments, the backup power supply circuit 21 is used to energize the EV power supply relay 8 when the charging gun 3 is connected while the ignition switch 11 is off, but other suitable power supply mounted on the vehicle may be used for the purpose.

Also, in the foregoing embodiments, the control unit 1 for performing the charging control corresponds to the control unit of the present invention, and the fault determination unit and the fault determination prohibition unit are included in the control unit 1. Alternatively, the fault determination unit and the fault determination prohibition unit may be included in a control unit that is separate from the charging control unit 1 and connected by a CAN and the like to the charger 2 to constitute a circuit.

In the described embodiments, the present invention is applied to an external charging system in which the charger 2 is connected to an external power supply to charge the battery. The present invention is however applicable to a charging system other than that connected to an external power supply to charge the battery. For example, it is applicable to a charging system in which a battery for auxiliary devices (battery 7) is charged by the driving battery.

In the case of this type of charging system, the charger 2 is connected to a time-measuring unit, not shown, which measures the amount of time that the vehicle remains at rest (ignition OFF time). When the time measured by the time-measuring unit reaches a predetermined reference time, a signal is sent from the time-measuring unit to the charger 2. When the signal reaches the charger 2, the control unit 1 and the charger 2 are activated, as in the above-described embodiments. Further, current flowing in the charging start signal circuit 5 provides a charging start signal to the control unit 1, whereby the start of charging can be detected. Thus, by applying the present invention, this type of charging system can be arranged such that a fault determination is made on the basis of a charging start signal sent from the charger when activated by the ignition switch tuning on, as in the described embodiments.

What is claimed is:

1. A fault diagnostic device for a charging system of a vehicle, comprising:
   a control unit which is connected to a charger mounted on the vehicle for a battery mounted on the vehicle to constitute a circuit; and
   a charging start signal circuit which causes the charger to output a charging start signal to the control unit,
   wherein the control unit includes a fault determination unit which determines fault of the charging start signal circuit, and
   wherein the fault determination unit judges the charging start signal circuit to be faulty if the control unit is not input with the charging start signal when the control unit is activated in response to turning on of an ignition switch of the vehicle.

2. The fault diagnostic device according to claim 1, wherein the control unit further includes a fault determination prohibition unit which prohibits the fault determination unit from determining fault of the charging start signal circuit, and
   wherein the fault determination prohibition unit prohibits the fault determination unit from determining fault of the charging start signal circuit if a power-supply voltage of the charging start signal circuit is lower than or equal to a predetermined value.

3. The fault diagnostic device according to claim 2, wherein the power-supply voltage of the charging start signal circuit is supplied from a backup power supply of the control unit.

4. The fault diagnostic device according to claim 1, wherein the fault determination unit judges that any one of disconnection, power-supply short circuit and grounding fault has occurred in the charging start signal circuit if the control unit is not input with the charging start signal.

5. The fault diagnostic device according to claim 2, wherein fault determination unit judges that any one of disconnection, power-supply short circuit and grounding fault has occurred in the charging start signal circuit if the control unit is not input with the charging start signal.

6. The fault diagnostic device according to claim 3, wherein the fault determination unit judges that any one of disconnection, power-supply short circuit and grounding fault has occurred in the charging start signal circuit if the control unit is not input with the charging start signal.

7. The fault diagnostic device according to claim 1, wherein the charger is connected to an external power supply to charge the battery.

* * * * *